United States Patent
Haghani et al.

(10) Patent No.: US 11,706,674 B2
(45) Date of Patent: Jul. 18, 2023

(54) PRE-FORWARDING DATA PACKETS FOR CONDITIONAL HANDOVER

(71) Applicant: Apple Inc., Cupertino, CA (US)

(72) Inventors: Ehsan Haghani, Redwood City, CA (US); Haijing Hu, Beijing (CN); Fangli Xu, Beijing (CN)

(73) Assignee: Apple Inc., Cupertino, CA (US)

(*) Notice: Subject to any disclaimer, the term of this patent is extended or adjusted under 35 U.S.C. 154(b) by 350 days.

(21) Appl. No.: 17/040,189

(22) PCT Filed: Sep. 29, 2019

(86) PCT No.: PCT/CN2019/108865
§ 371 (c)(1),
(2) Date: Sep. 22, 2020

(87) PCT Pub. No.: WO2021/056504
PCT Pub. Date: Apr. 1, 2021

(65) Prior Publication Data
US 2022/0279405 A1    Sep. 1, 2022

(51) Int. Cl.
*H04W 36/00* (2009.01)
(52) U.S. Cl.
CPC .. *H04W 36/00837* (2018.08); *H04W 36/0016* (2013.01); *H04W 36/0058* (2018.08); *H04W 36/0061* (2013.01)
(58) Field of Classification Search
CPC .. H04W 36/02; H04W 36/0016; H04W 92/20; H04W 36/00; H04W 36/0072; H04W 36/0058; H04W 36/0077
See application file for complete search history.

(56) References Cited

U.S. PATENT DOCUMENTS

2018/0317137 A1    11/2018    Loehr
2022/0030484 A1*   1/2022     Cheng ............ H04W 36/00837

FOREIGN PATENT DOCUMENTS

CN    101193440       6/2008
CN    105228200 A     1/2016
(Continued)

OTHER PUBLICATIONS

International Search Report for PCT/CN2019/108865, dated Jun. 29, 2020, 9 pages.
(Continued)

*Primary Examiner* — Dung Hong
(74) *Attorney, Agent, or Firm* — Kowert, Hood, Munyon, Rankin & Goetzel, P.C.

(57) ABSTRACT

Various embodiments are described for apparatuses, systems, and methods for pre-forwarding data packets for conditional handover. A UE may connect to a serving base station and perform measurement(s) of one or more neighboring base stations. The UE may provide measurement report(s) corresponding to the measurement(s) to the serving base station. The UE may receive handover assistance information from the serving base station. The handover assistance information may identify at least one neighboring base station that receives downlink packet forwarding of downlink packets intended for the UE prior to handover. The UE may evaluate handover conditions of the neighboring base stations, including the at least one neighboring base station. The UE may perform handover to a first neighboring base station of the at least one neighboring base station based on the at least one neighboring base station receiving downlink packet forwarding of downlink packets intended for the UE prior to handover.

20 Claims, 8 Drawing Sheets

(56) References Cited

FOREIGN PATENT DOCUMENTS

| CN | 105915400 | | 8/2016 | | |
|---|---|---|---|---|---|
| WO | WO-0130090 A2 | * | 4/2001 | ............ | H04W 36/02 |
| WO | 2016130062 | | 8/2016 | | |
| WO | 2018027933 A1 | | 2/2018 | | |
| WO | 2018170777 | | 9/2018 | | |
| WO | 2018230997 A1 | | 12/2018 | | |
| WO | WO-2019214806 A1 | * | 11/2019 | ............ | H04B 7/0695 |

OTHER PUBLICATIONS

RD-1713820 Conditional handover procedure 3GPP TSG-RAN2#100, LG Electronics Inc., Dec. 1, 2017, sections 1-3.
R2-1802693, Conditional handvoer procedure 3 GPP TSG-RAN2#101, LG Electronics Inc., Mar. 2, 2018, sections 1-3.
R2-1711682, Conditional handover procedure 3GPP TSG-RAN2#99bis, LG Electronics Inc.,Oct. 13, 2017, sections 1-3.
Extended European Search Report for EP Patent Application No. 19947356,2; dated Apr. 11, 2023.
Astri et al. "Discussion on Conditional Handover in NR"; 3GPP TSG-RAN WG2 NR ad hoc 1801 R2-1800663; Jan. 22, 2018.
Office Action for Chinese Patent Application No. 201980100836.X; dated May 11, 2023.

* cited by examiner

PRE-FORWARDING DATA PACKETS FOR CONDITIONAL HANDOVER

PRIORITY DATA

This application claims benefit of priority of Chinese patent application Serial No. PCT/CN2019/108865 titled "Pre-Forwarding Data Packets for Conditional Handover" filed Sep. 29, 2019, which is hereby incorporated by reference in its entirety as though fully and completely set forth herein.

TECHNICAL FIELD

The present application relates to wireless devices, and more particularly to apparatuses, systems, and methods for pre-forwarding data packets for conditional handover.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, for example in 5G new radio (NR), UEs may hand over from one base station to another. However, issues may arise for such handovers, such as link failure and/or packet transmission delay. Thus, improvements in the field are desirable.

SUMMARY

Various embodiments are described for apparatuses, systems, and methods for pre-forwarding data packets for conditional handover.

A UE may connect to a serving base station and perform measurement(s) of one or more neighboring base stations. The UE may provide measurement report(s) corresponding to the measurement(s) to the serving base station. The UE may receive handover assistance information from the serving base station. The handover assistance information may identify at least one neighboring base station that receives downlink packet forwarding of downlink packets intended for the UE prior to handover. The UE may evaluate handover conditions of the neighboring base stations, including the at least one neighboring base station. The UE may perform handover to a first neighboring base station of the at least one neighboring base station based on the at least one neighboring base station receiving downlink packet forwarding of downlink packets intended for the UE prior to handover.

In some embodiments, a non-transitory memory medium may include program instructions executable by a UE that, when executed, cause the UE to perform at least a portion or all of the above operations. In some embodiments, a method performed by the UE may include the UE performing the above operations. In some embodiments, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
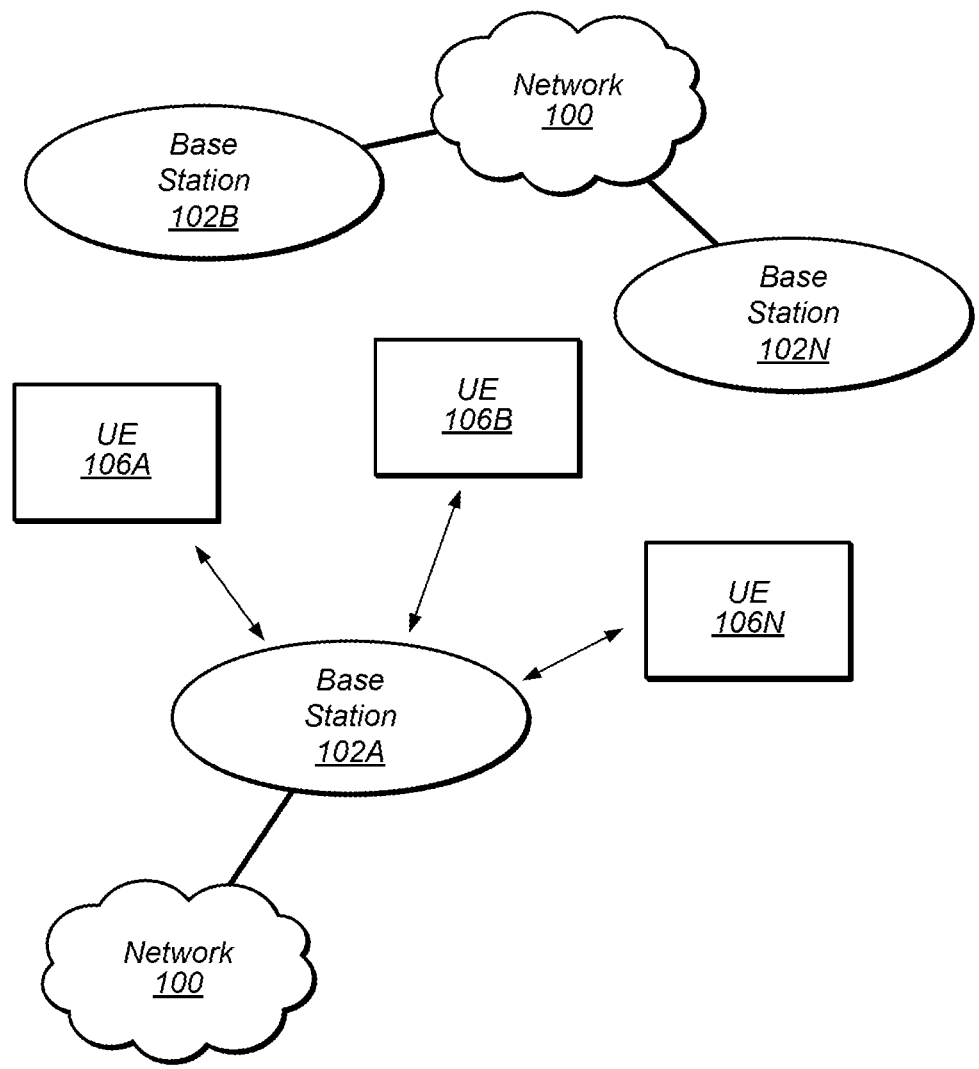
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:
UE: User Equipment
BS: Base Station
ENB: eNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System RRC: Radio Resource Control
IE: Information Element
QoS: Quality of Service
QoE: Quality of Experience
TFT: Traffic Flow Template
RSVP: Resource ReSerVation Protocol
API: Application programming interface Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (such as a smart watch), or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
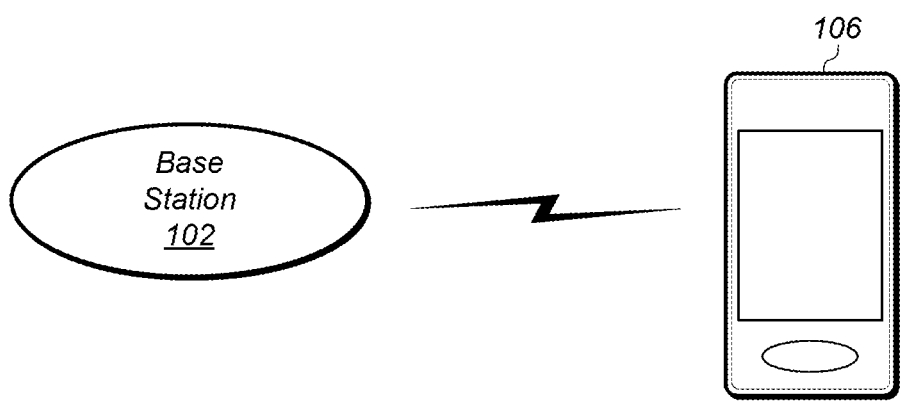
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 3:
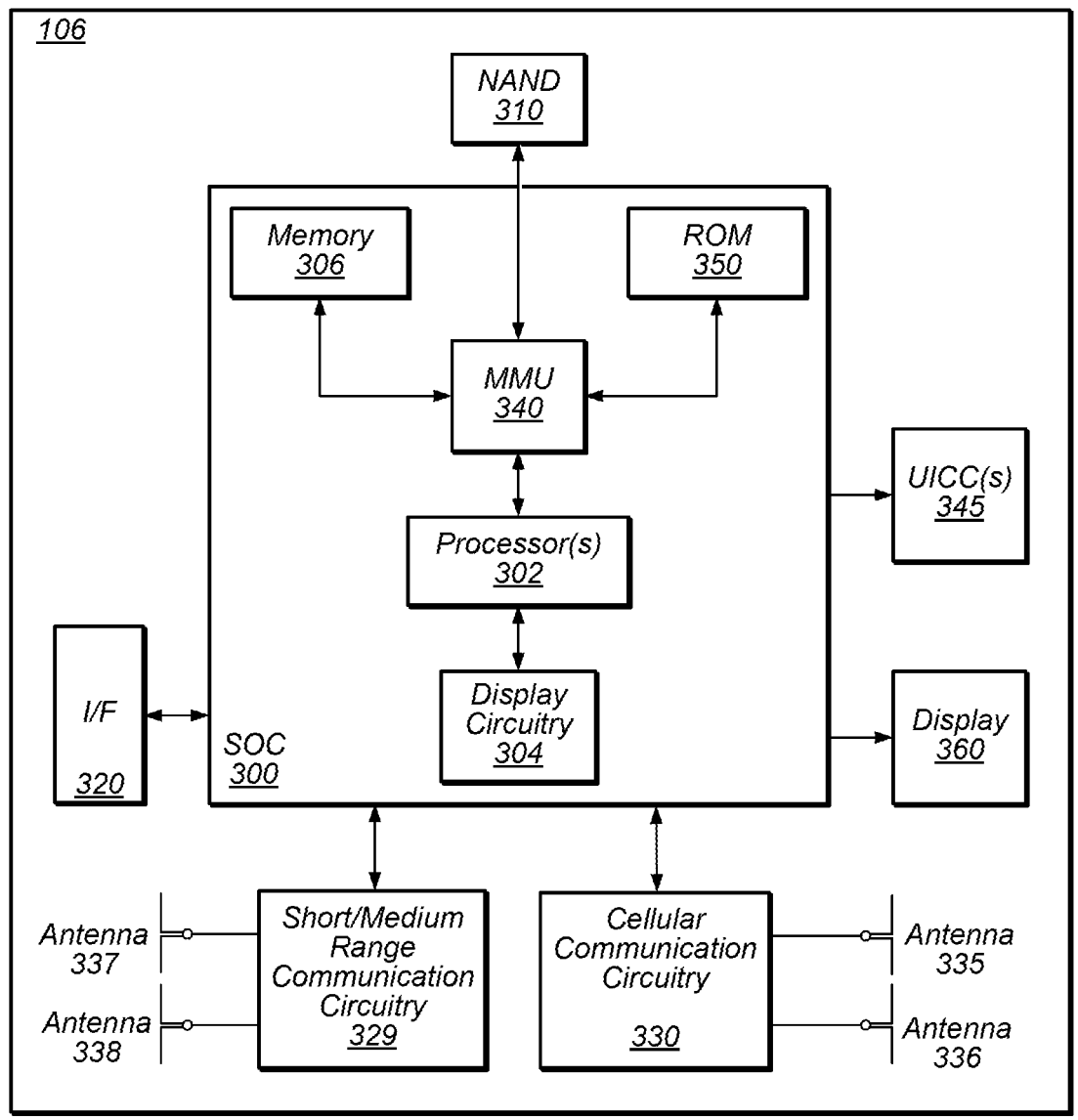
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
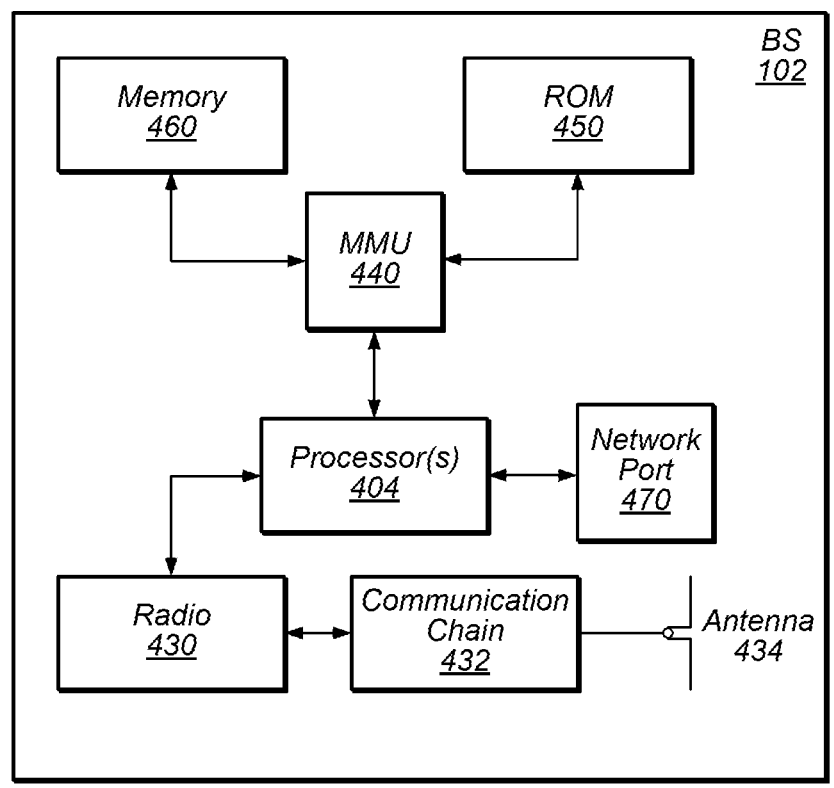
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
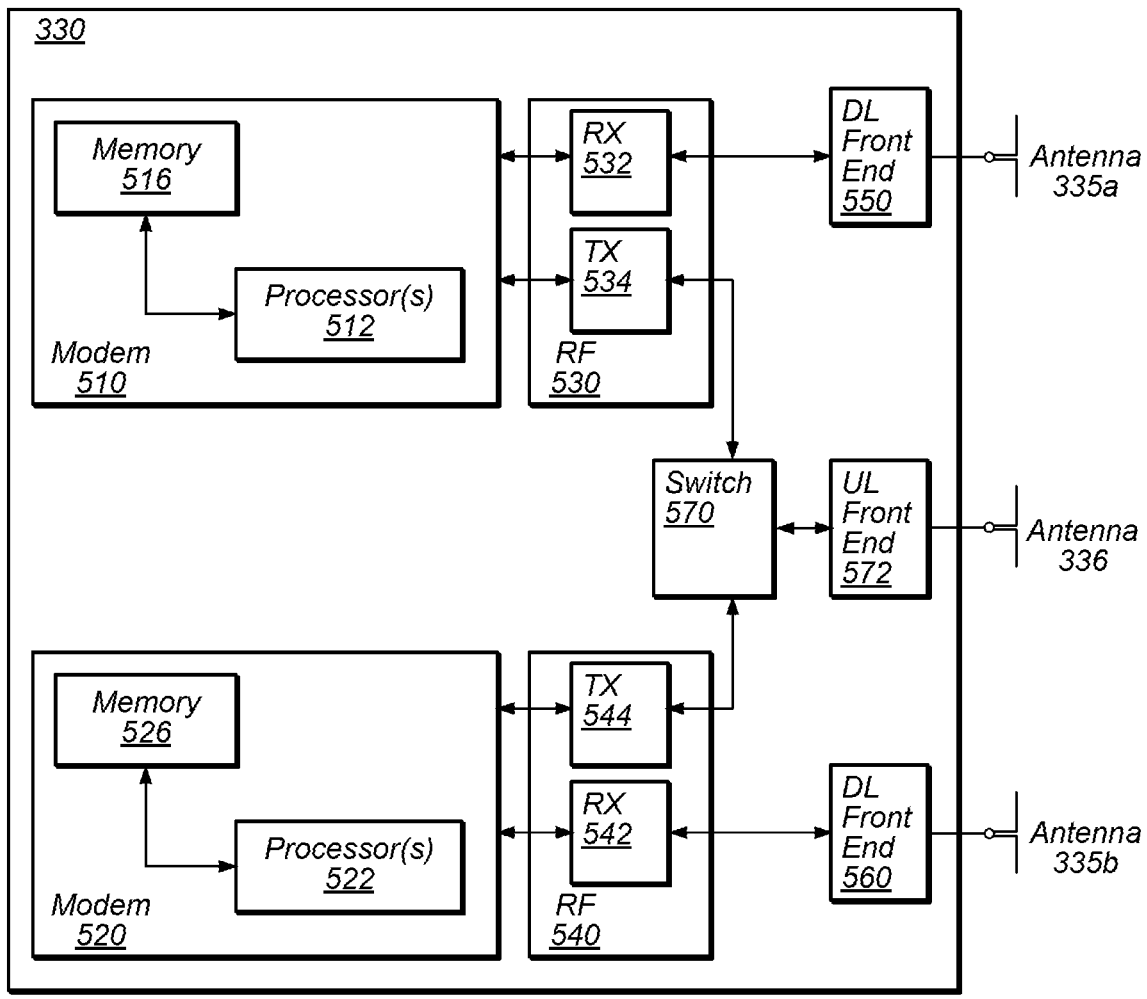
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
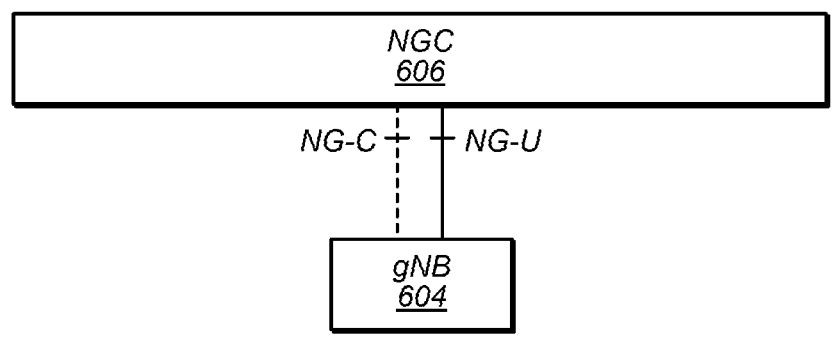
FIGS. 6 and 7 illustrate examples of a 5G NR base station (gNB), according to some embodiments.
Figure 7:
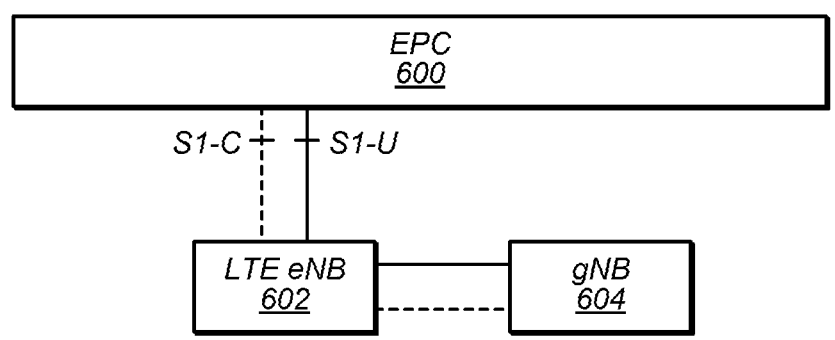

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
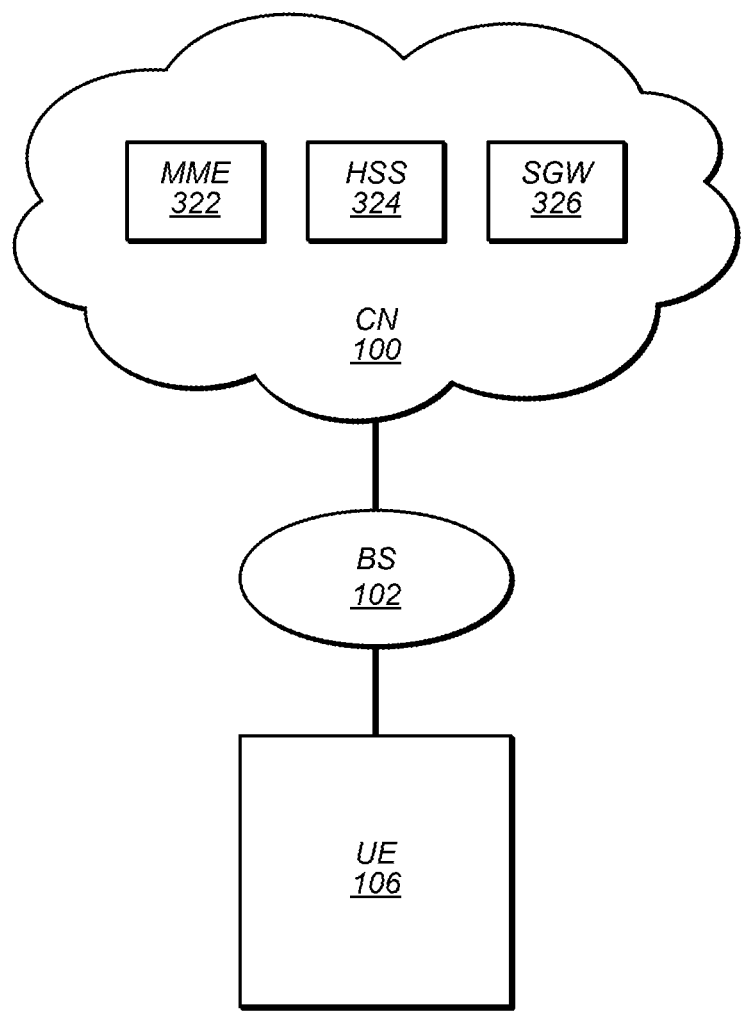
FIG. 8 illustrates an exemplary wireless network in communication with a UE, according to some embodiments.

FIG. 8—Wireless Communication System

FIG. 8 illustrates an example simplified portion of a wireless communication system. The UE 106 may be in communication with a wireless network, e.g., a radio access network (RAN), which may include one or more base stations (BS) 102 and may provide connection to a core network (CN) 100, such as an evolved packet core (EPC). The base station 102 may be an eNodeB and/or gNB (e.g., a 5G or NR base station) or other type of base station. The UE 106 may communicate in a wireless manner with the base station 102. In turn, the base station 102 may be coupled to a core network 100. As shown, the CN 100 may include a mobility management entity (MME) 322, a home subscriber server (HSS) 324, and a serving gateway (SGW) 326. The CN 100 may also include various other devices known to those skilled in the art.

Operations described herein as being performed by the wireless network may be performed by one or more of the network devices shown in FIG. 8, such as one or more of the base station 102 or the CN 100, and/or the MME 322, HSS 324, or SGW 326 in the CN 100, among other possible devices. Operations described herein as being performed by the radio access network (RAN) may be performed, for example, by the base station 102, or by other components of the RAN usable to connect the UE and the CN.

Figure 9:
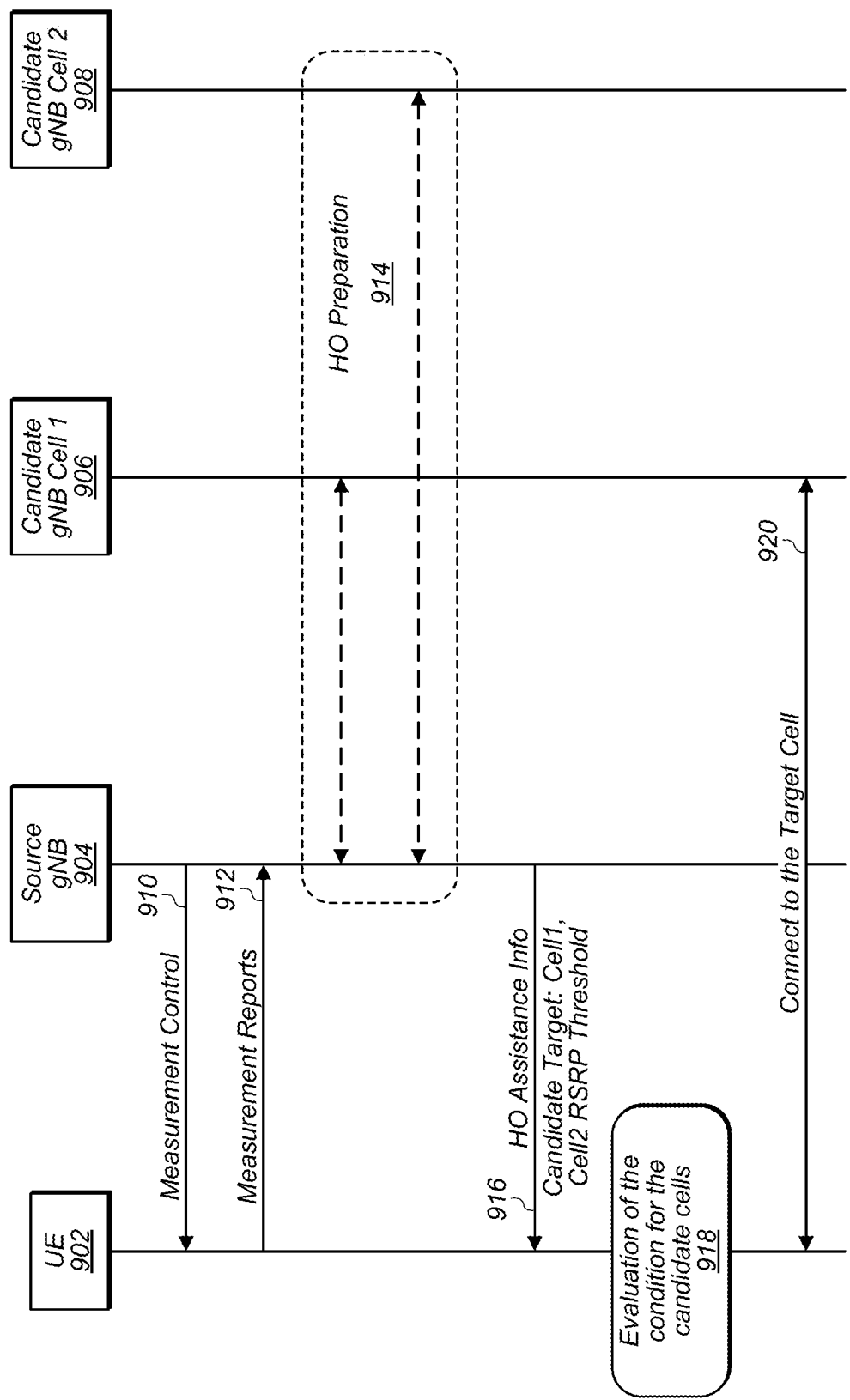
FIG. 9 is a message diagram illustrating an example method for conditional handover, according to some embodiments.
Figure 10:
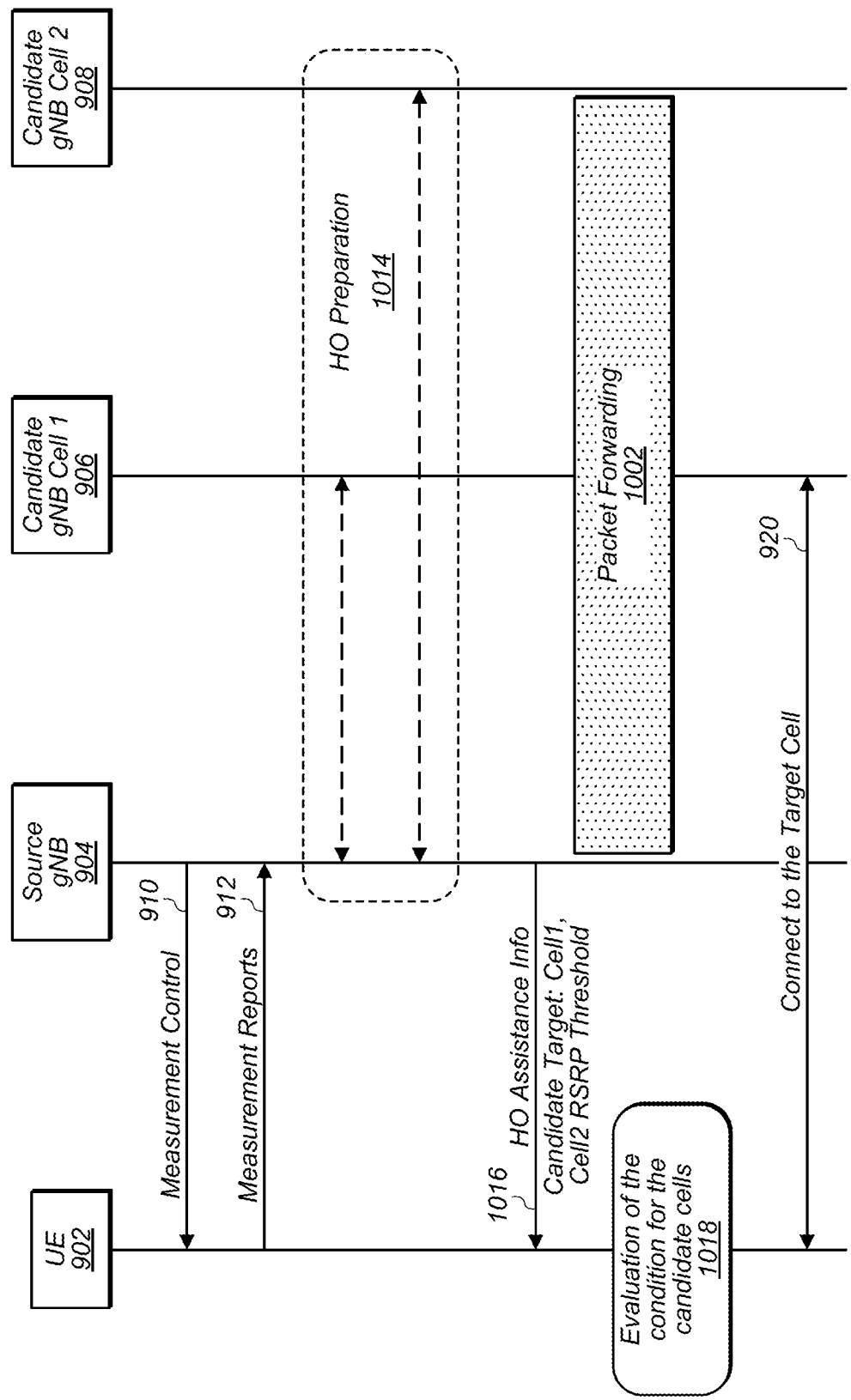
FIG. 10 is a message diagram illustrating an example method for conditional handover with pre-forwarding, according to some embodiments.

FIGS. 9 and 10—Conditional Handover

In some embodiments, a UE may be in communication with a serving cell. In the case of handover from a serving cell to a target cell, the serving cell may begin forwarding the data packets of a UE to a target cell after giving the handover (HO) command to the UE.

Conditional handover (CHO) may be used to improve mobility robustness and reliability in wireless networks (e.g., implementing LTE and/or NR). In some embodiments, conditional HO may operate as shown in FIGS. 9 and 10. Note that while FIGS. 9 and 10 are described in the context of NR (e.g., using language associated with NR, such as gNB), it may apply to any wireless standard as desired.

Aspects of the embodiments of FIGS. 9 and 10 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

As shown in FIG. 9, a UE 902 may be in communication with a source gNB 904, and there may be two different candidate gNBs for handover, 906 and 908.

The source gNB may provide measurement control information to the UE in 910. The measurement control information may include information related to measurements. For example, the measurement control information may specify timing requirements for performing measurements (e.g., of the source gNB 904 and/or neighboring base stations), serving cell thresholds for performing measurements (e.g., signal quality threshold of the source gNB 904), reference symbol (RS) type (e.g., such as SSB or CSI-RS), and/or other information related to performing measurements.

In 912, the UE may provide measurement report(s) on neighboring gNBs (e.g., including 906 and/or 908) to the source gNB 904. For example, the UE may perform one or more neighboring cell measurements based on the measurement control information provided in 910. The UE 902 may then provide the measurement report(s) to the source gNB at the appropriate time, e.g., according to the measurement control information provided in 910.

In 914, e.g., based on the measurement reports in 912, the serving gNB may prepare its neighbors for possible HO for the UE 902. Preparing the neighbors for possible HO may include providing information regarding the UE, providing information regarding current communications or sessions currently being used by the UE (e.g., such as QoS requirements or other information), and/or other information related to the UE and/or HO of the UE. For example, the serving gNB may provide the candidate gNBs with measurement results provided by the UE 902, e.g., including RS index and RSRP values of measured beams.

In 916, the source gNB 904 may provide HO assistance information to the UE 902. For example, the HO assistance information may identify the candidate gNBs 906 and 908. Additionally, the HO assistance information may specify HO conditions that the UE 902 may use to determine when to perform HO from the source gNB 904 to another cell (e.g., gNB 906 or gNB 908). For example, the HO assistance information may specify link quality thresholds for performing handover, such as RSRP thresholds, among other possibilities. In some embodiments, the UE 902 may be configured to perform the HO (e.g., upon the conditions being met) without any further messages being transmitted from the source gNB 904 to the UE 902 regarding the HO. Thus, the UE 902 may be configured to independently determine when to perform HO, without an explicit HO command from the source gNB 904, based on the HO assistance information.

Accordingly, in 918, the UE may monitor link quality of the neighboring cell(s) and decide when to execute HO based on the HO assistance information provided in 916.

In 920, the UE may perform HO and attach to a target gNB if HO conditions are met. In the embodiment of FIG. 9, the UE 902 performs handover to the gNB 906.

In the conditional HO shown in FIG. 9, the gNB 904 does not know to which cell the UE 902 will perform the HO nor at what time it may occur. As shown in FIG. 9, the serving cell may prepare some of the potential target cells for handover based on measurement reports.

In order to reduce the disruption on data flow during mobility, it may be beneficial if the serving cell 904 can pre-forward data packets belonging to UE to the candidate target cells (906 and 908) being prepared for the HO. Pre-forwarding of data packets may be useful because even short disruption to service due to mobility may result in large reductions in throughput of the UE 902 and/or user experience. Moreover, NR is expected to deliver multi Gbps, thus cells are expected to have high capacity backhaul, making pre-forwarding of UE traffic potentially feasible.

Accordingly, the message flow diagram of FIG. 10 includes the additional step of pre-forwarding packets to the candidate gNBs 906 and 908 prior to handover by the UE 902. Note that while two candidate gNBs are shown in FIG. 10, embodiments described herein may apply to one or a plurality of candidate cells, depending on various factors, such as design, gNB layout, gNB capabilities, etc. Additional modifications to the steps discussed in FIG. 9 are also contemplated in conjunction with the pre-forwarding of packets.

In one embodiment, this packet forwarding may be performed by a base station, e.g., the source gNB 904. The packet forwarding could be performed to the candidate gNBs 906 and/or 908 using connections between the source gNB 904 and the candidate gNBs 906 and 908, e.g., using Xn or X2 links.

In embodiments of FIG. 10, in addition to the HO preparation information already discussed, the serving cells can include additional information in the HO request message sent to a candidate target cell when preparing it for HO (1014). The additional information may include an indication of availability to pre-forward packets from the source gNB 904 and/or service requirements/QoS information (e.g., aggregate bitrate, latency requirements, etc.) of UE traffic of the UE 902.

During HO preparation 1014, the target cell(s) may be configured to indicate its preference in a HO acknowledge message. For example, the target cell (e.g., candidate gNB 906 and/or candidate gNB 908) may indicate if it is willing to accept packets before the UE HO/attachment. The target cell may also indicate a time duration in which the target cell will accept forwarded packets before the UE attaches.

Accordingly, the HO assistance information may include additional information according to the embodiments of FIG. 10. For example, the HO assistance information provided in 1016 may inform the UE if each of the candidate target cells have agreed to receive forwarded packets and for what time duration. For example, the source gNB 904 may indicate that one or both of candidate gNBs 906 and 908 will have packets forwarded to them. Thus, these cells may be indicated to the UE as candidate target cells receiving pre-forwarded downlink packets.

The source gNB 904 may also indicate a time period that packet forwarding will be performed for each of the candidate gNBs. The respective time periods of the candidate cells may be different. For example, the time duration of the packet forwarding 1002 may be a first time duration for gNB 906 and a second, different time duration for gNB 908. Alternatively, the duration for candidate neighbor cells may be "good until cancelled" or "good until modified". Thus, the gNB 904 may indicate that packet forwarding is being performed for one or more candidate neighbor cells, and then at a later time, provide an indication that packet forwarding has been cancelled or modified for those one or more candidate neighbor cells (e.g., on an individual or group basis, as desired).

In 1002, the gNB 904 may then perform packet forwarding accordingly. For example, the gNB may perform packet forwarding to the candidate cells that accept packet forwarding. The packet forwarding may also be for the time duration indicated by the candidate cells. Note that while the time duration has been described as being negotiated or indicated by the candidate gNBs, the time duration could be set statically, e.g., according to standards, according to rules set by the network, or based on any other system, as desired. The time duration may also vary dynamically, e.g., based on current conditions, such as network load, signal quality conditions, etc., if desired. Additionally, the time duration may be controlled by a network node, such as the core network and/or the serving base station. For example, the time duration could be "good until cancelled" or "good until modified".

In 1018, in addition to the evaluation discussed above in FIG. 9, the UE 902 may additional take into account whether or not a candidate neighboring cell is currently being forwarded packets based on the HO assistance information provided in 1016. For example, the UE 902 may prioritize the cells to which its packets are being pre-forwarded when selecting a target cell, e.g., to minimize the service disruption. Part of the evaluation may include the UE determining whether the packets are still being forwarded to the candidate base stations, e.g., based on a time duration received by the UE for the respective base station or other factors, such as whether the serving base station has indicated that the packet forwarding for the target neighbor base station has been cancelled or modified.

However, other factors may also be considered by the UE 902, such as signal quality metrics, cell loading, cell size, etc.

While FIG. 10 is described above as the packet forwarding 1002 being performed by the source gNB 904, it may be performed by other entities, e.g., by the core network (e.g., NR-AMF and/or LTE-MME, among other possibilities). For example, the packets may be directly duplicated and transmitted to all prepared cells from the core according to the following. Note that the preparation of the candidate cells may be performed by the source gNB 904 and/or by the core, as desired. Additionally, or alternatively, the source gNB 904 may provide information regarding the candidate gNBs 906 and 908 to the core, as desired.

In some embodiments, the source gNB 904 may include the following information in the HO request message sent to a candidate target cell to when preparing it for HO (1014): the possibility to pre-forward packets from source and/or service requirements/QoS information (e.g., aggregate bitrate, latency requirements, etc.) of UE traffic of the UE 902. Similar to above, the target cell may indicate its preference in the HO acknowledge message including: if it is willing to accept packets before the UE attachment and/or time duration in which the target cell accepts forwarded packets before the UE attaches.

Accordingly, the serving cell may inform the core network about list of all prepared cells willing to accept DL UE packets. Alternatively, each of the target cells may directly inform the core network if they are willing to receive UE packets before its attachment and/or for what time duration.

As a result, the packet forwarding 1002 may be performed by the core network, e.g., by transmitting copies of UE DL packets to all cells agreed to receive the pre-forwarded packets. Similar to above, the source gNB 904 may inform the UE if each of the candidate target cells have agreed to receive forwarded packets, e.g., and for what time duration. Also similar to above, during evaluation in 1018, the UE may prioritize the cells to which its packets were pre-forwarded when selecting a target cell, e.g., to minimize the service disruption.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
one or more processors, wherein the one or more processors are configured to cause a user equipment device (UE) to:
connect to a serving base station;
perform one or more measurements of one or more neighboring base stations;
provide one or more measurement reports corresponding to the one or more measurements to the serving base station;
receive handover assistance information from the serving base station, wherein the handover assistance information identifies at least one neighboring base station that receives downlink packet forwarding of downlink packets intended for the UE prior to handover;
evaluate handover conditions of the one or more neighboring base stations, including the at least one neighboring base station; and
perform handover to a first neighboring base station of the at least one neighboring base station based on the at least one neighboring base station receiving downlink packet forwarding of downlink packets intended for the UE prior to handover.

2. The apparatus of claim 1, wherein the handover assistance information includes a time duration during which the downlink packets are forwarded to the at least one neighboring base station.

3. The apparatus of claim 2, wherein said performing handover to the first neighboring base station is performed within the time duration.

4. The apparatus of claim 1, wherein the at least one neighboring base station includes a plurality of neighboring base stations, wherein the handover assistance information includes a respective time duration during which the downlink packets are forwarded to each neighboring base station of the plurality of neighboring base stations.

5. The apparatus of claim 4, wherein each respective time duration is different.

6. The apparatus of claim 1, wherein said performing handover is performed without receiving an explicit handover command from the serving base station.

7. The apparatus of claim 1, wherein packet forwarding to the at least one neighboring base station is performed by the serving base station.

8. The apparatus of claim 1, wherein packet forwarding to the at least one neighboring base station is performed by the core network of the at least one neighboring base station.

9. A method for performing conditional handover packet forwarding, comprising:
by a base station:
establishing communication with a user equipment device (UE);
receiving one or more measurement reports from the UE, wherein the one or more measurement reports are associated with one or more neighboring base stations;
transmitting handover assistance information to the UE, wherein the handover assistance information identifies at least one neighboring base station receiving packet forwarding;
determining the at least one neighboring base station to perform packet forwarding prior to handover by the UE; and
performing packet forwarding of downlink packets of the UE to the at least one neighboring base station, wherein said performing packet forwarding is performed prior to handover by the UE.

10. The method of claim 9, wherein the handover assistance information includes information related to an evaluation condition for handover execution for the at least one neighboring station receiving packet forwarding.

11. The method of claim 9, wherein the handover assistance information identifies a time duration associated with the packet forwarding.

12. The method of claim 9, wherein the handover is performed without transmitting an explicit handover command to the UE.

13. The method of claim 9, further comprising:
performing handover preparation with the one or more neighboring base stations, wherein said performing handover preparation includes:
transmitting an indication of a potential handover to each of the one or more neighboring base stations; and
receiving a response from each of the at least one neighboring base station, wherein each response indicates the respective neighboring base station accepts packet forwarding prior to handover by the UE.

14. The method of claim 13, wherein each response indicates a respective time duration for accepting packet forwarding prior to handover by the UE.

15. The method of claim 14, wherein the base station is configured to stop performing packet forwarding for each neighboring base station of the at least one neighboring base station based on the respective time duration.

16. The method of claim 9, wherein said performing packet forwarding is stopped upon handover of the UE.

17. A network node, comprising:
communication circuitry; and
one or more processors coupled to the communication circuitry, wherein the one or more processors are configured to cause the network node to:
determine a plurality of candidate neighboring base stations for handover of a user equipment device (UE);
transmit a handover preparation message to at least one of the plurality of candidate neighboring base stations, wherein the handover preparation message includes an indication of quality of service (QoS) information;
in response to transmitting the handover preparation message, receive an acknowledgement message indicating acceptance of packet forwarding before UE handover from the at least one of the plurality of candidate neighboring base stations;
perform packet forwarding of downlink packets of the UE to the at least one of the plurality of candidate neighboring base stations prior to handover of the UE from a serving base station to a neighboring base station; and
cease performing packet forwarding of downlink packets of the UE to the at least one of the plurality of candidate neighboring base stations after handover of the UE from the serving base station to the neighboring base station.

18. The network node of claim 17, wherein the network node is a base station.

19. The network node of claim 17, wherein the network node is included in a core network of the serving base station.

20. The network node of claim 17, wherein the network node is configured to:
- receive a first time duration associated with a first neighboring base station of the at least one of the plurality of candidate neighboring base stations;
- cease performing packet forwarding of downlink packets of the UE to the first neighboring base station upon expiry of the first time duration, wherein ceasing performing packet forwarding of downlink packets of the UE to the first neighboring base station is performed prior to handover of the UE from the serving base station to the neighboring base station.

* * * * *